US010311855B2

(12) United States Patent
Yassa et al.

(10) Patent No.: US 10,311,855 B2
(45) Date of Patent: Jun. 4, 2019

(54) METHOD AND APPARATUS FOR DESIGNATING A SOUNDALIKE VOICE TO A TARGET VOICE FROM A DATABASE OF VOICES

(71) Applicant: SPEECH MORPHING SYSTEMS, INC., San Jose, CA (US)

(72) Inventors: Fathy Yassa, Soquel, CA (US); Benjamin Reaves, Menlo Park, CA (US); Sandeep Mohan, San Jose, CA (US)

(73) Assignee: SPEECH MORPHING SYSTEMS, INC., San Jose, CA (US)

( * ) Notice: Subject to any disclaimer, the term of this patent is extended or adjusted under 35 U.S.C. 154(b) by 0 days.

(21) Appl. No.: 15/473,103

(22) Filed: Mar. 29, 2017

(65) Prior Publication Data

US 2017/0301340 A1    Oct. 19, 2017

Related U.S. Application Data

(60) Provisional application No. 62/314,759, filed on Mar. 29, 2016.

(51) Int. Cl.
| | | |
|---|---|---|
| G10L 17/00 | (2013.01) | |
| G10L 17/12 | (2013.01) | |
| G10L 13/00 | (2006.01) | |
| G10L 13/10 | (2013.01) | |
| G10L 13/033 | (2013.01) | |
| G10L 13/047 | (2013.01) | |
| G10L 25/51 | (2013.01) | |
| G10L 25/27 | (2013.01) | |
| G10L 25/24 | (2013.01) | |

(52) U.S. Cl.
CPC ............ *G10L 13/033* (2013.01); *G10L 13/00* (2013.01); *G10L 13/047* (2013.01); *G10L 13/10* (2013.01); *G10L 17/00* (2013.01); *G10L 17/12* (2013.01); *G10L 25/27* (2013.01); *G10L 25/51* (2013.01); *G10L 25/24* (2013.01)

(58) Field of Classification Search
CPC ......... G10L 17/00; G10L 17/02; G10L 17/04; G10L 17/06; G10L 17/08; G10L 17/12; G10L 13/00; G10L 13/033
See application file for complete search history.

(56) References Cited

U.S. PATENT DOCUMENTS

| | | | | |
|---|---|---|---|---|
| 6,253,179 | B1 * | 6/2001 | Beigi | G10L 17/04 704/243 |
| 8,160,877 | B1 * | 4/2012 | Nucci | G10L 17/06 704/246 |
| 9,336,782 | B1 * | 5/2016 | Patel | G10L 13/033 |
| 2003/0014250 | A1 * | 1/2003 | Beigi | G10L 17/02 704/238 |
| 2010/0114572 | A1 * | 5/2010 | Tani | G10L 17/08 704/247 |
| 2014/0142944 | A1 * | 5/2014 | Ziv | G10L 17/005 704/250 |
| 2014/0358541 | A1 * | 12/2014 | Colibro | G10L 15/063 704/245 |
| 2015/0025887 | A1 * | 1/2015 | Sidi | G10L 17/02 704/245 |

(Continued)

*Primary Examiner* — Samuel G Neway
(74) *Attorney, Agent, or Firm* — Sughrue Mion, PLLC (57) ABSTRACT

A soundalike system to improve speech synthesis by training a text to speech engine on a voice like the target speakers voice.

3 Claims, 6 Drawing Sheets

(56) References Cited

U.S. PATENT DOCUMENTS

2015/0340039 A1* 11/2015 Gomar .................... G10L 17/00
  704/246
2017/0076727 A1* 3/2017 Ding ....................... G10L 17/08
2017/0301340 A1* 10/2017 Yassa .................... G10L 13/033

* cited by examiner

METHOD AND APPARATUS FOR DESIGNATING A SOUNDALIKE VOICE TO A TARGET VOICE FROM A DATABASE OF VOICES

CLAIM OF PRIORITY

This patent application claims priority from U.S. Provisional Patent Application No. 62/314,759, filed on Mar. 29, 2016 in the U.S. Patent and Trademark Office, the disclosure of which is incorporated herein by reference in its entirety.

BACKGROUND

1. Field

Embodiments herein relate to a method and apparatus for exemplary speech synthesis.

2. Description of Related Art

Typically, speech synthesis is accomplished through the use of a speech synthesizer which generates speech through one or more pre-programmed voices.

SUMMARY

Embodiments of the present application relate to speech synthesis using a voice that is similar to the target speaker's voice.

Speech synthesis is the artificial production of human speech. A computer system used for this purpose is called a speech computer or speech synthesizer and can be implemented in software or hardware. A text-to-speech (TTS) system converts normal language text into speech; other systems render symbolic linguistic representations like phonetic transcriptions into speech.

A text-to-speech system, or engine, is composed of two parts: a front-end and a back-end. The front-end has two major tasks. First, it converts raw text containing symbols like numbers and abbreviations into the equivalent of written-out words. This process is often called text normalization, pre-processing, or tokenization. The front-end then assigns phonetic transcriptions to each word, and divides and marks the text into prosodic units, like phrases, clauses, and sentences. The process of assigning phonetic transcriptions to words is called text-to-phoneme or grapheme-to-phoneme conversion. Phonetic transcriptions and prosody information together make up the symbolic linguistic representation that is output by the front-end. The back-end often referred to as the synthesizer then converts the symbolic linguistic representation into sound. In certain systems, this part includes the computation of the target prosody (pitch contour, phoneme durations) which is then imposed on the output speech.

To synthesize a target speakers voice, a TTS must first train on the target voice. The speaker speaks many hours of utterances spanning all the possible language information, e.g. phonemes, diphones, triphones, etc. For optimal training, the speaker reads these utterances from text provided to him/her. The speaker reads an utterance and an Automatic Speech Recognizer (ASR) converts the audio into text. This text is matched with the actual text provided to him and label matching is done to check the correctness and the quality of the utterance. Further processing is done on the audio to get the right sampling rate and noise free audio signal. This is done for all audio and once ready, the audio is supplied to an algorithm to build a model based on distinctive characteristics (features) such as pitch, vocal tract information, formants, etc. These features are extracted and a mathematical (probabilistic) model is constructed based on well-known algorithms.

When an incoming target voice is to be synthesized, the target voice is received by an ASR which outputs text. The text is broken down to units present in the model trained earlier, the closest unit is obtained along with the audio part of that unit with prosody. This is done for all the units in the input string and once the audio attaches to the unit, a stitching process is performed to combine these audio parts along with the units into an audio clip which must sound natural as if the actual human is talking The problem inherent in training a TTS is that a TTS requires the speaker to spend dozens of hours, if not more, to properly train the TTS. Specifically, the TTS needs enough speech to adequately synthesize the target speaker's voice.

The solution herein is to select a voice, aka the soundalike voice, from a database of voices, wherein the soundalike voice is substantially similar to the target voice and use the soundalike voice to build the TTS voice, i.e. train the TTS.

This computer system described herein is optimally configured to determine which voice from the database of voices is the most similar to the target voice.

The ideal database will have voices in the language of the target speaker; a range of voices (pitch, gender, accent, etc.) is preferable. For example, a database containing a statistically significant distribution of voices is more likely to contain a good match to a speaker with a deep male voice than a database of primarily soprano female voices. This is because the identity of the target speaker is often unknown and thus a wide range of voices is more likely to find a good match. However, even when the identity of the speaker is partially known (e.g. gender), a wide distribution of voices in the database is still optimal. However, on occasion it is preferable to have a database with a narrow distribution of voices. This can occur when the target voice is constrained, e.g. male tenors.

Optimally a database should contain at least 200 voices, each voice having spoken 200 sentences of 5 to 6 seconds duration per sentence. Thus a database will have 200,000 to 240,000 seconds or approximately 55 to 66 hours of voice data.

DETAILED DESCRIPTION OF THE EMBODIMENTS

Figure 1:
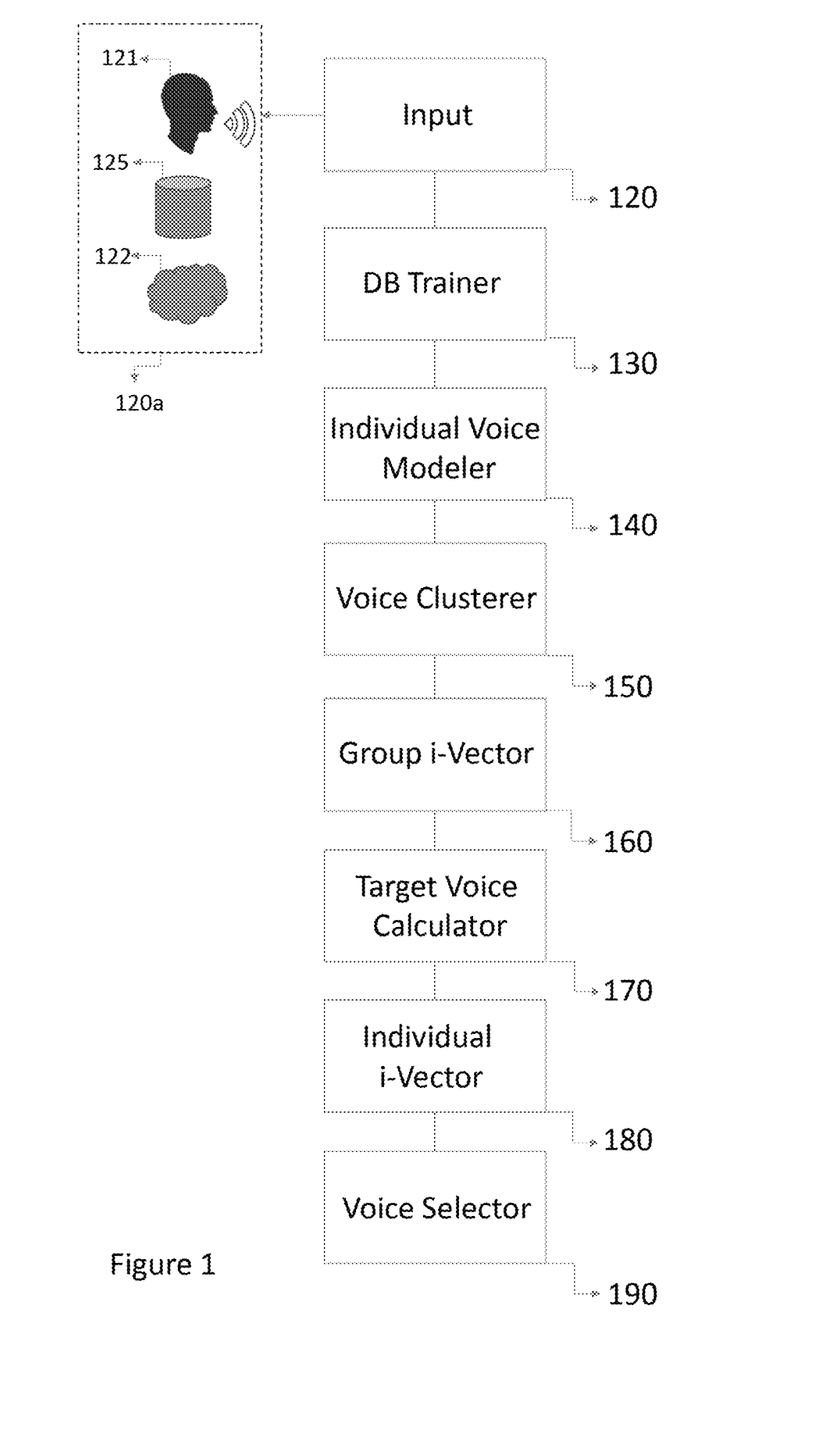
FIG. 1 is a schematic diagram of the soundalike computer system.

FIG. 1 illustrates a block diagram for selecting a voice, from a database of voices, which is substantially similar to a target voice.

The soundalike system in FIG. 1 may be implemented as a computer system 110; a computer comprising several modules, i.e. computer components embodied as either software modules, hardware modules, or a combination of software and hardware modules, whether separate or integrated, working together to form an exemplary computer system. The computer components may be implemented as a Field Programmable Gate Array (FPGA) or Application Specific Integrated Circuit (ASIC), which performs certain tasks. A unit or module may advantageously be configured to reside on the addressable storage medium and configured to execute on one or more processors or microprocessors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or modules or further separated into additional components and units or modules.

Input 120 is a module configured to receive the Voice 120b from an Audio Source 120a. The Audio Source 120a maybe be one of several sources including, but not limited to, Human 121 speaking, Streamed Speech 122 or preferentially the Database 125 containing human speech, aka voices, but may also be a live person speaking into a microphone, synthesize speech, streamed speech, etc.

DB Trainer 130 is a module configured to train a database by extracting the Mel Frequency Cepstral Coefficients (MFCCs) from the Voice 120b in Audio Source 120a, using the extracted MFCCs to create the DB Model 130a of the database.

Individual Voice Modeler 140 is a module configured to build a mathematical model of each individual voice obtained from Audio Source 120a.

Voice Clusterer 150 is a module configured to cluster aka classify voices from Audio Source 120a into two or more groups, the Group 150a by characteristic inherent with each voice, including, but not limited to gender, pitch and speed.

Group I-Vector 160 is a model configured to calculate a single i-vector for each Group 150a.

Target Voice Calculator 170 is a module configured to calculate the i-vector of the target voice, the Target i-Vector 170a.

Group Selector 175 is a module configured to select the closest Group 150a to the Target I-Vector 170a, e.g. with the smallest Euclidean distance between the Target i-Vector 170a and the Group 150a or the highest probability score.

Individual i-Vector 180 is a module configured to calculate the i-vectors of each Voice 180a, the Voice 180a within the selected Group 150a.

Voice Selector 190 is a module configured to select the voice with the smallest Euclidean distance between the target i-Vector 170a and Voice 180a.

Figure 2:
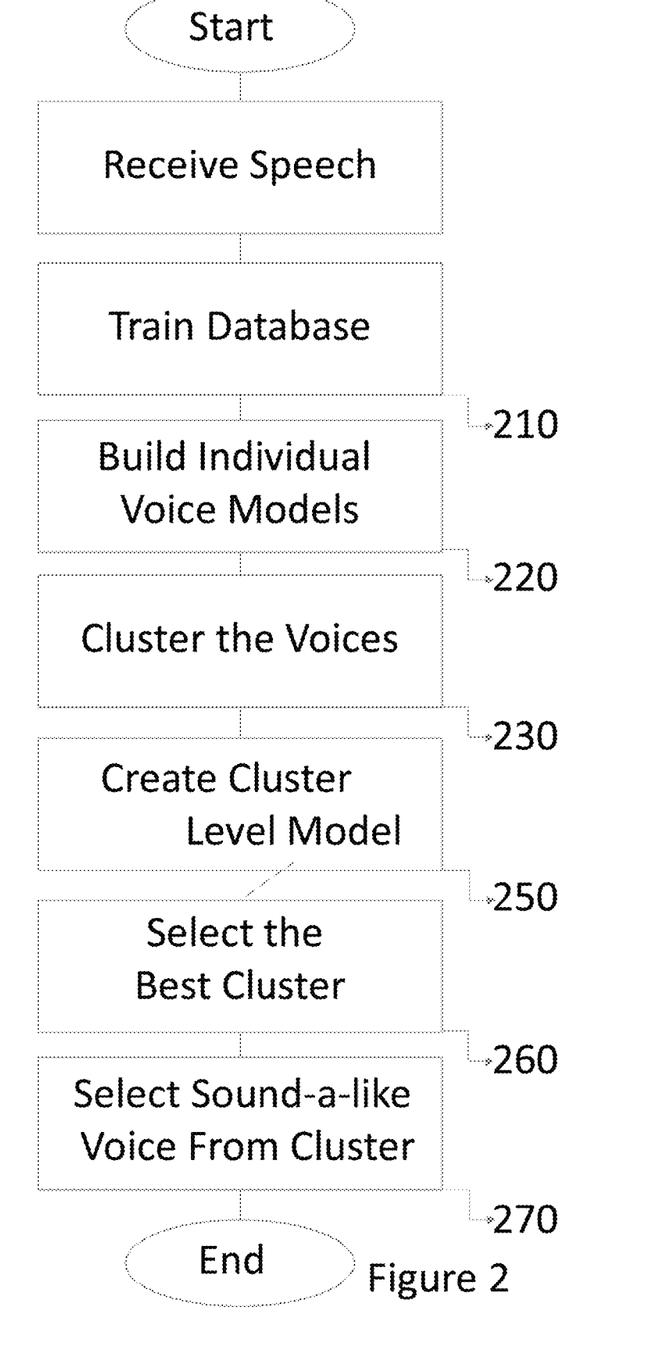
FIG. 2 illustrates a high flow diagram of the soundalike selection process.

FIG. 2 illustrates a high flow diagram of the soundalike selection process. At step 210, the soundalike system trains the database. At step 220, the soundalike system builds mathematical models of each voice within the database. At step 230, the soundalike system groups, i.e. creates clusters, of voices based on similarities between the voices e.g. pitch, speed, etc. step 240, the soundalike system creates mathematical models of each cluster. At step 260, the soundalike selects the cluster most likely to contain the soundalike voice. At step 270, the soundalike system selects the voice from within the selected cluster that is closest to the target voice.

Figure 3:
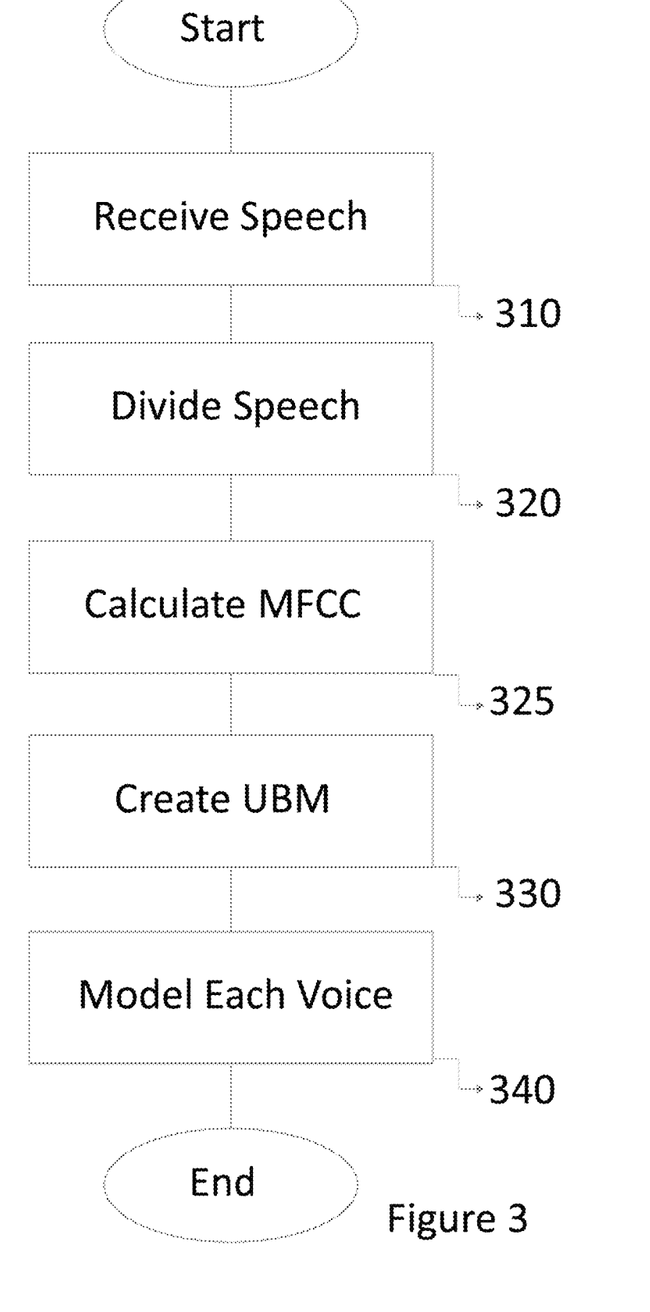
FIG. 3 illustrates a flow diagram of training the Database 125.

FIG. 3 illustrates a flow diagram of training the Database 125. At step 310, the Input 120 received the Voice 120b from Database 125. The Database 125 should contain enough Voice 120b to be statistically significant. Optimally Database 125 should contain at least 300 voices, each voice having spoken 300 sentences of 5 to 6 seconds duration per sentence. Thus Database 125 will have 300,000 to 340,000 seconds or approximately 55 to 66 hours of voice data.

The Database 125 needs to be trained. Training a database means building a mathematical model to represent database. In speech synthesis, the ultimate result of training for soundalike is creating i-vectors for the cluster and speaker level. This is a final low dimension representation of a speaker. At Step 320, the DB Trainer 130 divides the human speech into a plurality of frames, Frames 130a, each Frame 130a being generally the length of a single phoneme or 30 milliseconds. At step 325, DB Trainer 130 calculates N Mel Frequency Cepstral Coefficients, or MFCCS, for each Frame 130a which corresponds to the number of features extracted, i.e. the number of features in the target voice such as pitch, speed, etc., which will matched against the voices in the Database 125. In the preferred embodiment, DB Trainer 130 calculates 42 MFCCs per Frame 130a over a sliding window equal which increments by ½ the length of Frame 130a.

At step 330, the DB Trainer 130, uses the extracted MFCCs from Database 125 to create UBM 130b, a universal background model of the Database 125. Creating a universal background model is within the scope of one skilled in the art of speech synthesis. The UBM 130b results in three matrices, the Weight 135a, the Means 135b and the Variance 135c.

Subsequent to modeling the Database 125, each Voice 120b must be modeled. At step 340, the Individual Voice Modeler 140 builds a mathematical model for each Voice 120b using a Maximum Apriori Probability, or MAP, algorithm which combines the UBM 130b with the extracted MFCCs from each Voice 120b. Building a mathematical model of a single voice using a Maximum Apriori Probability algorithm is within the ordinary scope of one skilled in the art of speech synthesis.

In another embodiment, Individual Voice Modeler 140 creates a mathematical model of each voice directly using the universal background model. Building individual voice mathematical models using the universal background model algorithm is within the scope of one skilled in the art of speech synthesis.

Figure 4:
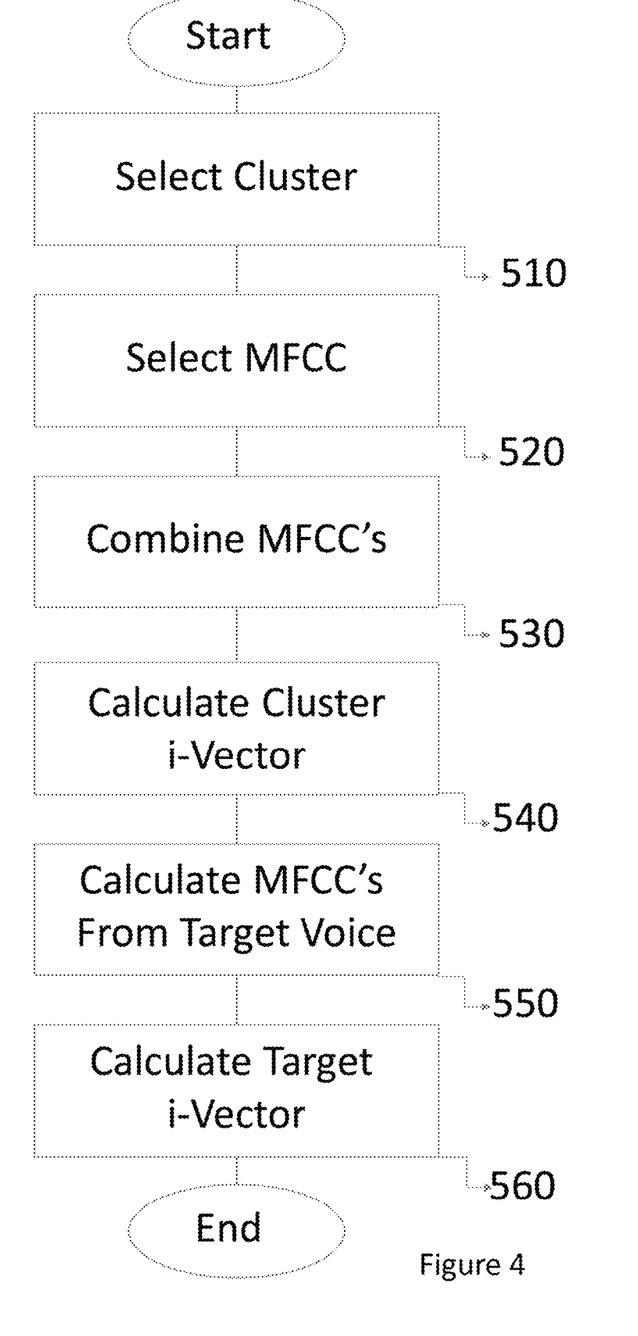
FIG. 4 illustrates a K-Means clustering.

FIG. 4 illustrates a K-Means clustering. Applying a clustering algorithm is within the scope of one skilled in the art of speech synthesis. In the preferred embodiment, the clustering algorithm is a k-means algorithm. K-means stores k centroids that it uses to define clusters. A point is considered to be in a particular cluster if it is closer to that cluster's centroid than any other centroid. K-Means finds the best centroids by alternating between (1) assigning data points to clusters based on the current centroids (2) choosing centroids (points which are the center of a cluster) based on the current assignment of data points to clusters.

There is no well-defined value for "k", but experimentally, between 40 and 50 clusters is ideal for a database containing millions of voices.

FIG. 4 illustrates a sample of k=2, i.e. two clusters (e.g. male and female voices).

Once the number of clusters has been determined, the soundalike system builds a cluster model. A cluster model is a mathematical representation of each cluster within the selected database. A cluster model allows all of the voices within the cluster to be represented with a single mathematical model.

Figure 5:
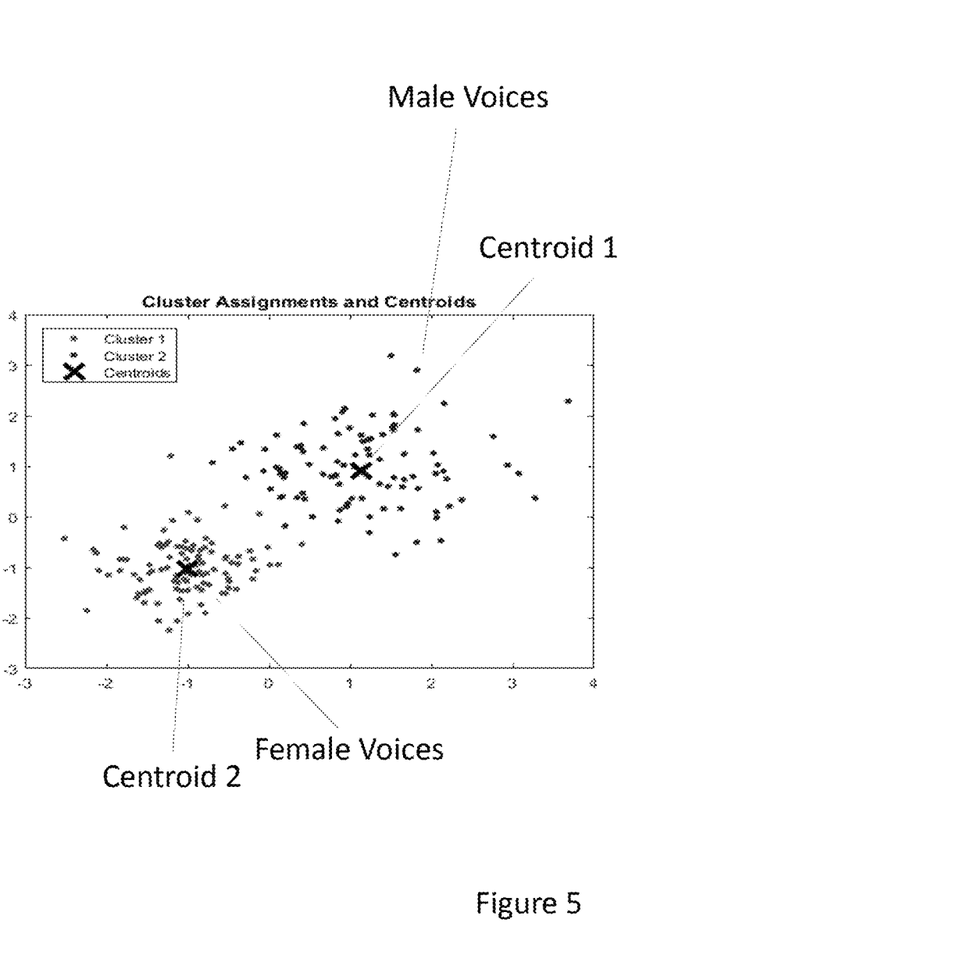
FIG. 5 illustrates a flow diagram of the soundalike system creating a mathematical model for the database at the cluster level and calculating the i-vector of the target voice.

FIG. 5 illustrates a flow diagram of the soundalike system creating a mathematical model for the database at the cluster level and calculating the i-vector of the target voice. At step 510 Group I-Vector 160 selects a single cluster of voices. At step 520, Group I-Vector 160 selects the MFCCs from all of the voice within the selected cluster. At step 530, the feature vectors, or MFCCs are combined together using any number of mathematical combinations. In the preferred embodiment, at step 530, Group I-Vector 160 simply creates the matrix 160a by stacking the vectors, although other combinations such as summation, averages, means, etc. can be applied. A universal background model algorithm is applied to the Matrix 160a. At step 540, Group I-Vector 160 calculates the i-vector of the selected cluster. The result is the mathematical model of the selected cluster. Group I-Vector 160 repeats for each cluster in Database 125.

At step 550, the Target Voice Selector 170 extracts the MFCCs of the target voice over a plurality of frames, each frame being approximately 20 s, the length of a phoneme. In the preferred embodiment, the MFCC's are calculated over a sliding window equal in length to a single Frame 130a At Step 560, the Target i-Vector 165 is calculated by applying the universal background model to the MFCCs of the Voice 120b. Calculating an i-Vector is within the scope of someone skilled in the art of speech synthesis.

Figure 6:
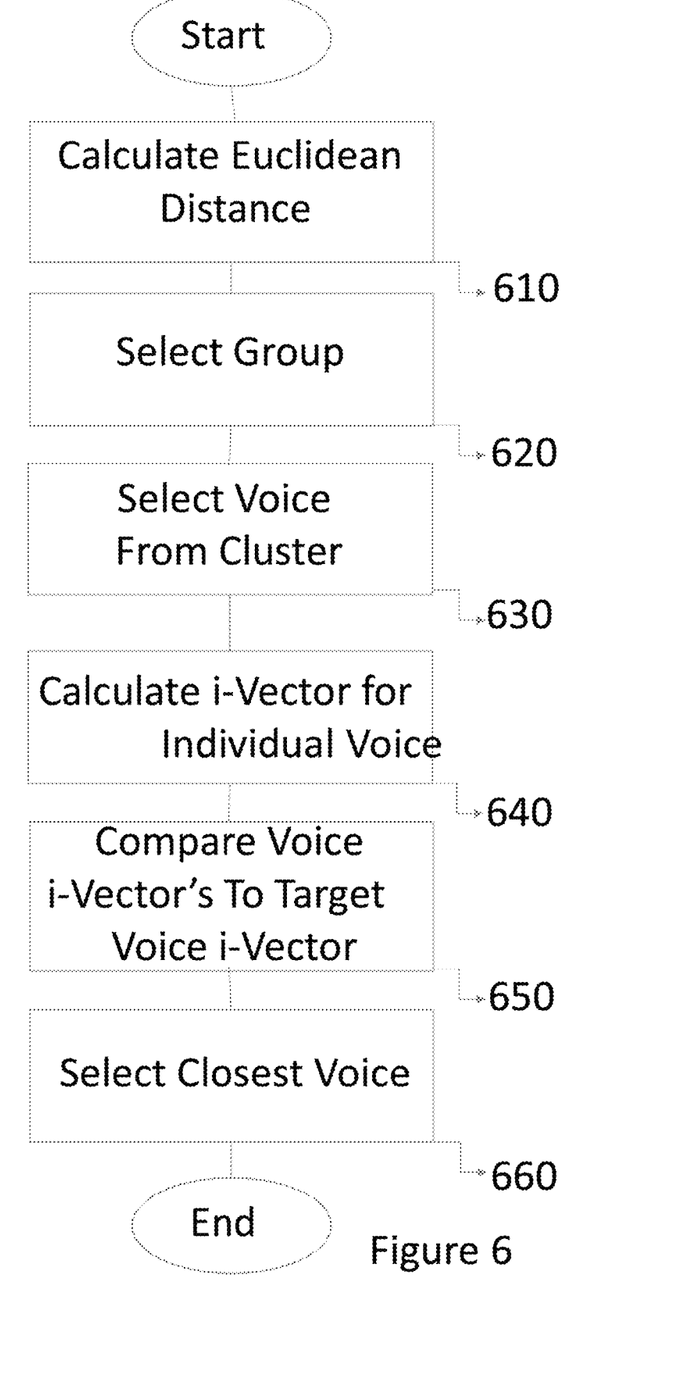
FIG. 6 illustrates a flow diagram of Group Selector 175 determining which group contains the soundalike voice.

FIG. 6 illustrates a flow diagram of Group Selector 175 determining which group contains the soundalike voice. At step 610, Group Selector 175 calculates the Euclidean distance between the i-vector of each group and the Target I-Vector 165. At Step 620, Group Selector 175 selects the Group with the lowest Euclidean distance to the Target I-Vector 165.

Once the Group 175a has been selected, the i-vectors of each individual voice must be calculated.

At step 630, Individual I-Vector 180 selects the Voice 120b within Group 175a. At step 640 Individual I-Vector 180 calculates the i-vector of each Voice 120b.

At step 650, Voice Selector 190 compares the I-Vector of each voice in Group 175a with the Target I-Vector 165 and closest I-vector as the soundalike voice. In the preferred embodiment of the invention, the soundalike system selects the Voice 120b with the smallest Euclidean distance to the target voice as the soundalike voice.

We claim:

1. A speech synthesis system comprising:
a text-to-speech (TTS) system;
a database that stores a collection of voices; and
a processor configured to:
  perform training on each voice among the collection of voices stored in the database by building a mathematical model of each voice among the collection of voices stored in the database,
  cluster each voice among the collection of voices stored in the database into a voice cluster among a plurality of voice clusters based on similarities between voice characteristics of each voice among the collection of voices stored in the database,
  calculate an i-vector for each voice cluster among the plurality of voice clusters, the i-vector for each voice cluster among the plurality of voice clusters representing a mathematical model of each voice cluster among the plurality of voice clusters;
calculate a target i-vector for a target voice,
identify a matching voice cluster among the plurality of voice clusters having an i-vector among the i-vectors for each voice cluster among the plurality of voice clusters that most closely matches the target i-vector for the target voice,
calculate i-vectors of each voice within the matching voice cluster,
identify a soundalike voice that most closely matches the target voice among each voice in the matching voice cluster having an i-vector among the i-vectors for each voice in the matching voice cluster that most closely matches the target i-vector for the target voice, and
build a TTS voice from the soundalike voice for training the TTS.

2. The speech synthesis system of claim 1, wherein the i-vector of the matching voice cluster has a lowest Euclidean distance from the target i-vector for the target voice among the i-vectors for each voice cluster among the plurality of voice clusters, and
wherein the i-vector of the soundalike voice has a lowest Euclidean distance from the target i-vector for the target voice among the i-vectors for each voice in the matching voice cluster.

3. The speech synthesis system of claim 2, wherein voice characteristics comprise at least one of speech pitch and speech speed.

* * * * *